United States Patent [19]
Hunt

[11] 3,743,870
[45] July 3, 1973

[54] MOVING COIL LINEAR ACTUATOR
[75] Inventor: Frederick C. Hunt, Anaheim, Calif.
[73] Assignee: LTV Ling Altec, Inc., Anaheim, Calif.
[22] Filed: June 28, 1972
[21] Appl. No.: 266,862

Related U.S. Application Data
[63] Continuation of Ser. No. 141,879, May 10, 1971, abandoned.

[52] U.S. Cl. ................................................. 310/13
[51] Int. Cl. .......................................... H02k 41/02
[58] Field of Search ..............................310/12–14, 27; 335/222; 340/178.1 C; 179/115.5

[56] References Cited
UNITED STATES PATENTS

| | | | |
|---|---|---|---|
| 3,161,793 | 12/1969 | Laithwaite | 310/27 |
| 3,505,544 | 4/1970 | Helms | 310/13 |
| 3,619,673 | 11/1971 | Helms | 310/13 |
| 3,659,124 | 4/1972 | Lathrop | 310/13 |
| 3,666,977 | 5/1972 | Helms et al. | 310/13 |

OTHER PUBLICATIONS
Hu, "Linear Actuator with Shorted Turn to Reduce Coil Inductance," IBM Tech. Disc. Bulletin Vol. 13, No. 4, 9/1970, p. 978

*Primary Examiner*—D. F. Duggan
*Attorney*—Harry R. Lubcke

[57] ABSTRACT

An electo-magnetic reciprocable motor employing plural slab permanent magnets and an essentially rectangular magnetic structure of the center-gap type. Typically, a square or rectangular drive coil of plural turns surrounds a central leg of the magnetic structure and is influenced by flux on all four sides. A single shorted-turn coil is stationary upon the central leg and is shorter than the central leg to provide reduction of inductance and damping. Longitudinal space is provided between each magnet to accommodate a mechanical take-off structure of stems attached to the drive coil and external electrical conductors connected thereto. A shorter single-ended version of the motor is also possible.

10 Claims, 4 Drawing Figures

Patented July 3, 1973

MOVING COIL LINEAR ACTUATOR

This is a continuation of application, Ser. No. 141,879, filed May 10, 1971, now abandoned.

BACKGROUND OF THE INVENTION

This invention pertains to a motor structure having a fixed single turn element and a movable wound element.

The linear actuator art has evolved from the early dynamic loudspeaker. This had a pot-like single-ended magnetic structure, a movable coil within the single-ended gap, and a load, the loudspeaker cone, immediately adjacent to the coil and attached thereto.

This structure has certain disadvantages, among which are limited linear translation, high leakage flux entering the load area, and inefficiency of the magnetic circuit due to saturation and the bulk required to obtain a given useful fieldstrength.

Certain of these disadvantages were overcome in the more nearly rectangular magnetic — "coil" structure of the James A. Ross U.S. Pat. Nos. 2,944,194 and 3,152,270. These; however, were evolved primarily for vibration testing.

Subsequent center-gap type magnetic structures, of both cylindrical and of top and bottom rectangular construction, have been developed, but lack obtainable advantages while retaining certain disadvantages. One such obtainable advantage is low manufacturing cost. A disadvantage for the cylindrical type is limited space for attaching the mechanical drive from coil to load.

SUMMARY OF THE INVENTION

A rectangular or square central-leg magnetic structure with a drive coil of rectangular or square cross-section in combination with four slab magnet-energized air gaps working on all sides of the drive coil outperforms prior art devices.

A magnetic structure external to the magnets is composed of simple slabs of ferromagnetic material, such as cold rolled steel. The rectangular configuration of coil, magnets and external slabs conveniently combines to provide four longitudinal spaces for a rigid structure for reciprocal movement and for external-going electrical conductors connected to the coil. Prior circular magnetic structures must be circumferentially interrupted to accomplish this.

A single shorted-turn coil, typically in extended sheet form, is stationary upon the central leg and is shorter at the retracted end for movable coil structure than is the central leg. This arrangement provides a reduction of effective inductance to almost any desired value, provides fast acceleration of the moving coil, and also provides damping at the end of translation of the drive coil by an increase of impedance thereof. The slab magnets are preferably the same length as the shortened shorted-turn coil. This desirably reduces the force upon the drive coil at the end of the translation.

The configuration provides a desirably large mechanical force for a given electrical input to the drive coil at an impedance which matches that of the usual power supply.

The structure is inexpensive to manufacture. The machine work required is minimal and the flat magnets employed are inexpensive.

DESCRIPTION OF THE PREFERRED EMBODIMENTS

It will be noted in the figures that a significant aspect of all embodiments herein is the rectangularity of the magnetic and coil structure and an enclosed center gap of the magnetic circuit.

This is the opposite to the known pot-like structure of a dynamic loudspeaker and any derivatives thereof.

The typical structure according to this invention is a magnetic and coil structure of square cross-section, with a magnetic gap on each of the four sides of the coil.

This structure is certain to satisfy most applications; however, a relatively tall and narrow configuration can be fabricated. This is desirable where lateral space is at a premium in the device where the actuator is used, or if the package to be driven is tall and narrow. The magnetic gap on the four sides of the now rectangular coil is retained.

This rectangular actuator can be turned on its side and thus have a low flat configuration.

The preferred magnetic structure herein includes plates of ferromagnetic material at the front and the back of the actuator. The front is the end at which the armature-coil stems protrude, for fastening to a useful load.

Figure 4:
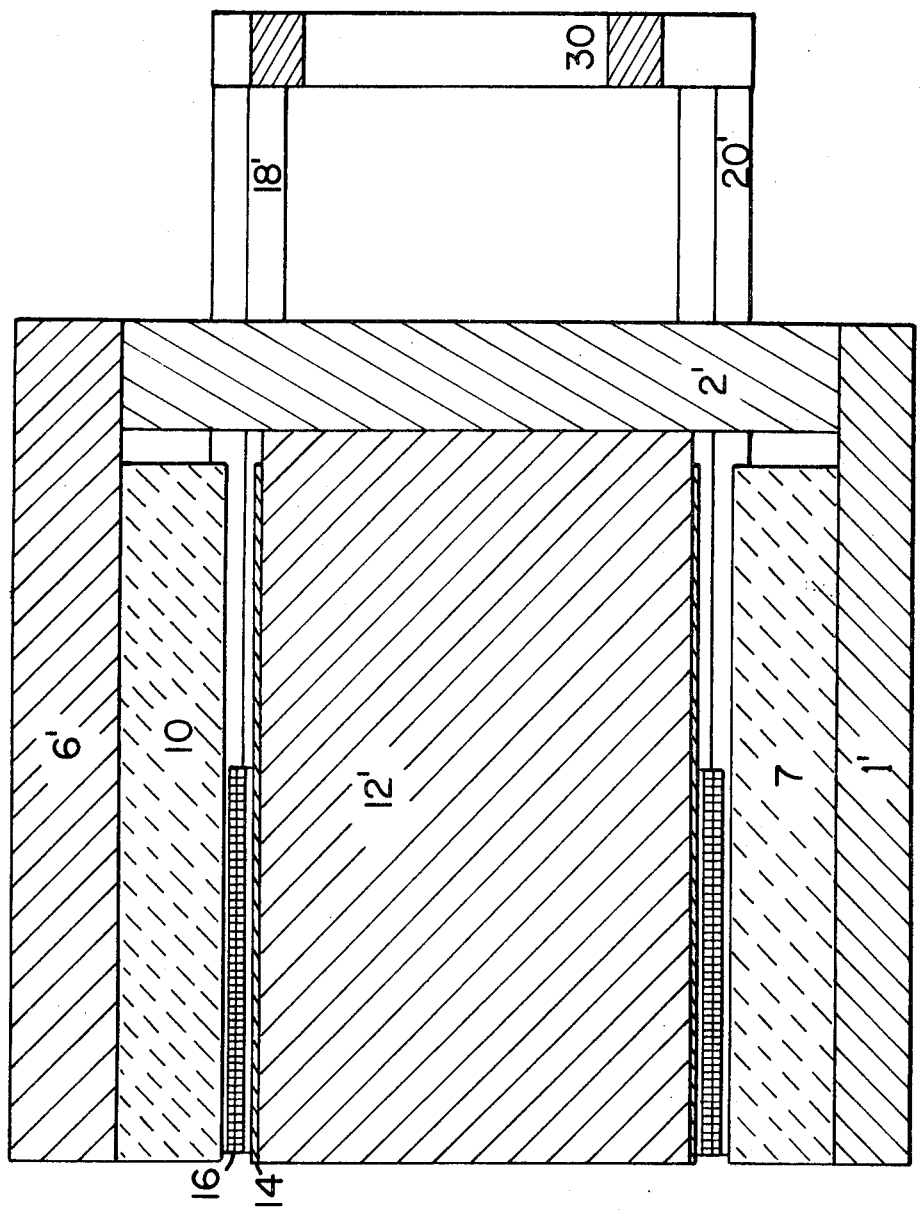
FIG. 4 is a longitudinal view similar to FIG. 2, but showing the rear plate eliminated and the actuator shortened.

In the alternate embodiment of FIG. 4 the rear plate of the magnetic circuit is omitted. This increases the stray field from the actuator, but almost exclusively away from the load, which may be magnetically sensitive. The actuator is shorter than before and is less expensive to manufacture.

Also, the front plate may instead be omitted. This does increase the stray field near the load, but this is not of consequence if the load is not magnetically sensitive. The structure is again shorter.

Figure 2:
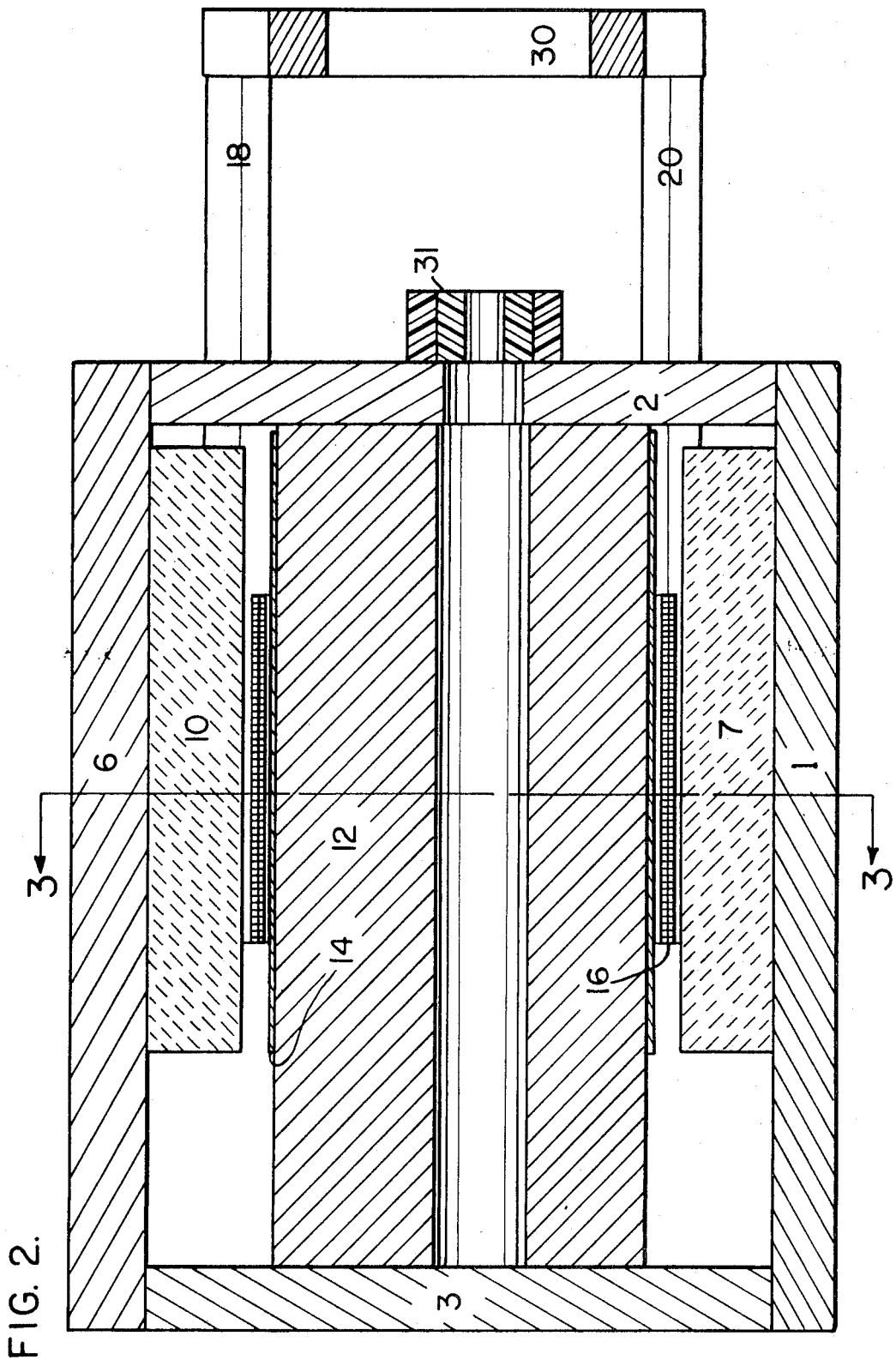
FIG. 2 is a longitudinal cross-sectional view along lines 2—2 in FIG. 1, through the center of the actuator.

With either end plate removed the increase of coil impedance at the end of translation is not as great as with the full structure of FIG. 2. This is because the iron circuit is not closed.

Figure 1:
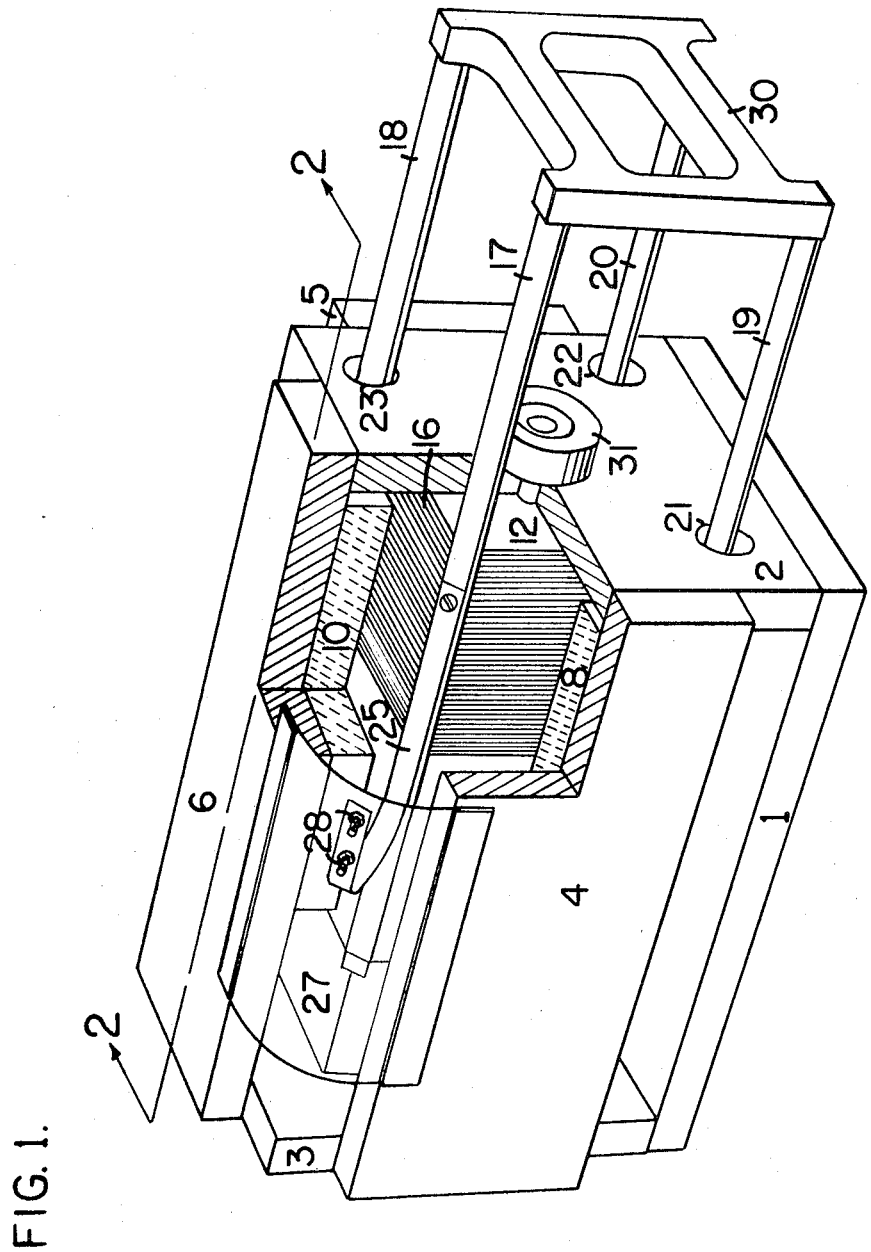
FIG. 1 is a partially broken-away perspective view of the linear actuator.

In FIG. 1, bottom plate 1 is shown to extend laterally to the full extent of front plate 2 and rear plate 3. All plates are of commercially available bar stock, such as cold rolled steel, and do not require machining other than to cut to the proper length and drilling holes for assembly with screws (not shown). It is not required that the bottom plate extend to the full extent of the end plates for magnetic reasons, but such extension provides greater convenience in fastening the actuator to the structure with which it may be used. Tapped holes may be provided here as well as for the assembly screws, as will be understood, and so these have not been shown.

Side plates 4 and 5 and top plate 6 are also attached to both end plates 2 and 3. The structure shown in FIG. 1 is of square transverse cross-section, and so has square end plates. The structure is modified to rectangular by increasing the height and/or decreasing the width of the end plates, while making corresponding adjustments in the width of each of the side, bottom and top plates. The more-than-two outer plates of this invention are represented in FIGS. 1 and 2 by four.

Completing the essential stationary outer magnetic structure is a slab permanent magnet bonded to the inside surface of each of the plates; bottom, sides and top. Such magnets have a north pole over all one side of the slab and a south pole over all of the opposite side. While various magnetic materials may be used, for low cost and satisfactory magnetic strength and retentivity, ceramic permanent magnets are preferred, such as grade 5 barium carbonate-iron oxide, or a grade 8 strontium carbonate-iron oxide magnet.

An alternate material is Alnico 8. These magnets are more expensive but have over twice the effective flux density of the ceramic material. They are of value where greater force is to be exerted for a given current through the movable coil.

The fabricated plates and magnets have a rectangular parallelopiped shape.

Figure 3:
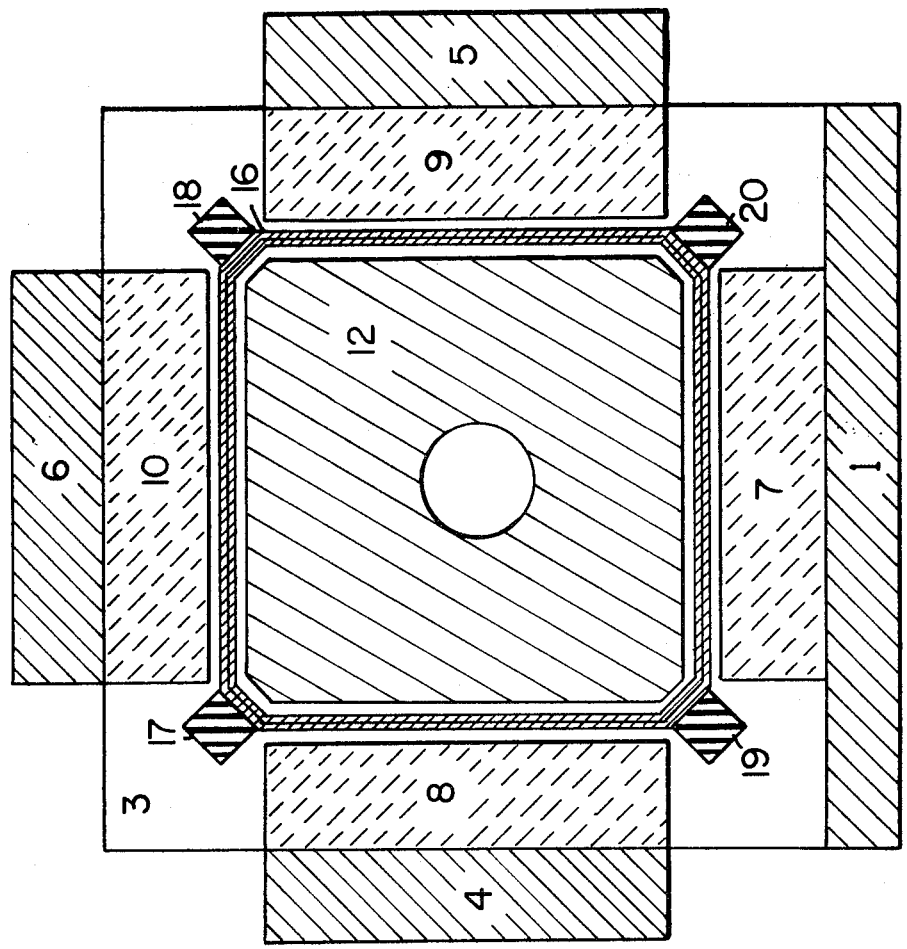
FIG. 3 is a transverse cross-sectional view along lines 3—3 in FIG. 2, through approximately the center of the actuator, longitudinally.

In the embodiment shown in transverse section in FIG. 3, it will be noted that all magnets 7,8,9,10 are of the same width and thickness. The width is normally about the same as the width of side plates 4 and 5 and top plate 6, giving a desirable mechanical and magnetic configuration. Tests have shown that the performance of this actuator is essentially the same whether the magnets have the same width, are somewhat wider, or are somewhat narrower than the plate to which they are attached.

In the longitudinal section shown in FIG. 2, it is seen that magnets 7 and 10 are considerably shorter than the corresponding plate involved. This is the end away from the load and is involved only when the moving system is in the retracted and near retracted positions. In these positions precise positioning of the moving system is not usually required and a damping effect on what is typically a full stroke is desired. Thus, a reduced strength of the magnetic field at this extreme position is in order.

The advantages of this invention may be obtained in embodiments from very small to very large sizes. The size illustrated may be considered medium, and the length of the plates, such as 1, is eight inches.

The magnets are attached to the corresponding plates preferably by an epoxy cement. Any general purpose room-temperature epoxy is adequate.

The magnets are oriented so that the south poles are all bonded to the four outer plates 1,4,5,6, with the north poles consequently facing the drive coil. The exactly opposite arrangement, with all of the south poles facing the drive coil is equally desirable.

A centrally disposed center pole 12 of cold rolled steel is also fastened between end plates 2 and 3. For a magnetic structure and moving coil of square cross-section the center pole is also square. The four corners are chamfered slightly to better accommodate the moving structure at these corners. A hole may be provided axially through the pole piece to accommodate a velocity transducer, or for other purposes. The increase in reluctance is minimal.

Rigidly fastened around center pole 12 is shorted turn 14. This is typically a copper sheet which is seam welded to the center pole in order to be a uniform conductor and mechanically secure.

The principal moving member is coil 16. In the typical loudspeaker or actuator device of the prior art this coil is circular. Herein it is rectangular, with the square cross-section shown being the known special case of the rectangle. The coil is wound to be self-supporting and typically has plural layers, two being shown in FIG. 2. Round or rectangular copper or aluminum insulated wire, perhaps 250 turns, is wound upon a rectangular mandrel and treated with high temperature epoxy to be strongly integrated.

The length of coil 16 is determined by the force required, once the cross-section of center pole 12 has been determined. The length of the magnetic gap is equal to the length of the coil plus the desired stroke plus any desired end clearance for mechanical reasons. A typical length of stroke is 3½ inches.

The mechanical motion produced by the moving (or armature) coil 14 is extended externally for connection to a load by plural, typically four, stems (or posts) 17,18,19,20. These are preferably made of epoxy glass to provide both sufficient mechanical strength and rigidity as well as an insulator in contact with the drive coil and flexible leads from that coil. As can be best seen in FIG. 4, one stem is attached to a chamfered corner of coil 14. A high temperature epoxy is suitable for cementing these longitudinal supports to the coil.

Clearance holes for each stem, such as those labeled 21,22,23 in FIG. 1, are provided in front plate 2. The moving system is typically retained centrally located in the magnetic gaps between the magnets and center pole 12 by an external guidance system. This may be comprised of ball bearings attached to the moving system, as extended for connection to the load, which roll along tracks or ways that are parallel to the stems. Alternately, air bearings in the external structure may be used. If external guidance might be absent, stationary ball or air bearings bearing upon stems 17,18,19,20 may be employed, preferably front and back by extending the stems through rear plate 3.

Flexible leads are provided for carrying energizing electric current to and from coil 16. These are normally attached to the two upper stems 17 and 18. One lead 25 is attached to one end of coil 16, and the other lead (not seen) to the other end. The leads are typically thin berrylium copper strap.

An insulative terminal support 27 is formed of initially flat but flexible epoxy glass sheet. This is held in a curved shape between adjacent plates, such as 4 and 6, by flat strap washers and screws.

The plural armature stems are rigidly attached to front end adaptor 30. This is extensive enough to meet the several stems, but may be relieved in the center to give a light-weight movable structure, as shown in FIG. 1. The adaptor is typically formed of a structurally stiff aluminum or magnesium alloy. The external mechanical load is attached to the adaptor. When this consists of plural magnetic heads for a disk magnetic memory the greater part of the moving system is associate therewith, making it logical to attach the translative tracking means external to the actuator, as has been described.

A bumper 31 is frequently included to act as a mechanical buffer to the movable system at its fully retracted position. This may be formed of a polyurethane outer cylinder surrounding a nylon or delrin inner cylinder.

As to what occurs in the operation of the actuator of this invention, the sheet type shorted-turn 14 has a self-commutating effect with respect to its function to reduce the inductance of moving coil 16. Turn 14 has a relatively large longitudinal extent, but as the moving coil translates longitudinally only the portion of turn 14 that is under the moving coil is inductively coupled to it. A back-e.m.f. is induced in the shorted turn, causing a large current to flow in it, the magnetic field of which acts to cancel the magnetic field that is responsible for the inductance of moving coil 16.

This non-sliding-contact manner of accomplishing this function, which the prior art accomplished only with a brush sliding over an uninsulated path along a compensating coil, is seen to give ruggedness, dependability, simplicity and long life to the actuator of this invention.

Shorted turn 14 also provides electrical and motional damping because of its electrical resistance. This, in effect, is added to the electrical resistance of the moving coil 16.

The thickness of the shorted turn is determined by the magnitude of inductance reduction and damping that is required. The inductance reduction tends to increase with thickness and the resistance to decrease with thickness. The objective is usually to obtain minimum impedance at the particular frequency involved in actuating the actuator, which is usually accomplished by supplying electrical pulses. Thicknesses of one-eighth inch for the shorted turn are usual.

Shorted turn 14 is not continued to the rear of the actuator. This is done so that the inductance will rise when coil 16 is moving to the far left in FIGS. 1 or 2. This increases the back-e.m.f. of coil 16, decreasing the current through it. Thus, it slows down, incrementally, and is easier to stop. It will be understood that the motion of the armature structure is typically quite rapid, such as a time interval of only 50 milliseconds for accomplishing a two inch stroke.

In a typical application the actuator is under the control of a feedback servo circuit, which provides starting and stopping pulses of short duration and opposite polarity. These pulses are of considerable current amplitude and are normally derived from a capacitor discharge type power supply. Thus, the moving system is typically very rapidly started and very rapidly stopped. The positioning is precisely accomplished, of the order of a very few thousandths of an inch, since 200 tracks of magnetic information are often contained within a useful stroke of two inches of the actuator.

The total stroke of the actuator is typically greater, as 3½ inches, than the working stroke. This allows the magnetic head structure to be retracted out of the way when it is desired to change the magnetic disks in the magnetic memory or similar device. These disks are at the right in FIG. 2, beyond adaptor 30, and so the retraction is to the extreme left for the moving coil system.

It is significant to comprehend that the prior art has employed a shorted turn only in the vicinity of the stroke where damping is desired. It then operates on the current generator principal. Herein, damping is obtained by the increase in inductance of the moving coil because of the absence of the shorted turn, at the left end of the stroke in FIG. 2.

The external magnetic field of the actuator of FIG. 1 is relatively very small, being of the order of 2 gauss in the area of the magnetic disks to the right of adaptor 30.

It is possible to embody this invention in a shorter form, longitudinally, by eliminating rear plate 3 and shortening the whole structure at the rear end, if desired. This is shown in FIG. 4. The stray field at the working (right) end of the actuator is increased, perhaps by a factor of two, but this may have little effect in most applications. The mechanical structure becomes one of cantilever beams, secured to front plate 2 in FIG. 4; rather than beams supported at both ends, as in FIG. 2.

In a similar manner, rear plate 3 may be retained but front plate 2 eliminated in another alternate embodiment that is also shorter than the dual-end-supported basic structure. This modification may not be desirable for magnetic field sensitive loads, since the stray field is close to the load and is increased by a factor of approximately seven. This arrangement is similar to FIG. 4, but the change is at the opposite end.

In these modifications the end plate that remains is normally fabricated thicker than an end plate when two are used, also the side plates may be made thicker. This reduces any tendency toward saturation in these members, since then end plate 2 for example, tends to have twice as much flux in it as when two end plates are used. FIG. 4 shows the increased thickness for plates 2' and 6'. Center pole 12' is shown without a central hole and it is shorter than center pole 12 in FIG. 2. Magnets 7 and 10 are the same in both figures.

As to the electrical and magnetic characteristics of the short embodiments, these are modified somewhat by the one open end and because the moving coil 16 passes out of the magnetic structure (to the left) in FIG. 4 during the full retracting stroke a distance of the order of 1½ inches. The coupling between drive coil 16 and compensating coil 14 is less close than before because the magnetic circuit is no longer closed. Also, the inductance of the drive coil when in the retracting area at the left does not increase as much as before, since it tends toward being an air core rather than an iron core coil in that position.

I claim:

1. A linear positioning device comprising;
   a. a rectangular core structure including a rectangular center pole (12)
      and more than two separate rectangular parallelopiped outer plates (1,4,5,6) spaced therefrom by at least one separate end piece (2 or 3) to respectively define more than two elongated gaps as assembled,
   b. a rigid structure for reciprocative movement along said center pole,
      including a moving coil (16) of plural turns concentrically disposed around said center pole, threading each of said gaps, and having a mechanical load attached at one end, and
   c. a permanent slab magnet (7, 8, 9, 10) shorter than said outer plates mounted upon each of said outer plates and interposed in a said elongated gap adjacent to said moving coil, asymmetrically placed along the length of said gap nearest said mechanical load to produce only a unidirectional magnetic flux across said gap along the whole length thereof to pass through said moving coil.

2. The device of claim 1 in which;
a. the number of said outer plates is four.
3. The device of claim 1 in which;
a. the width of each of said magnets is restricted to provide space at the corners of the rectangular assembly for elements of said rigid structure.
4. The device of claim 1, which additionally includes;
a. a stationary shorted coil of sheet form (14) having at least one turn and disposed upon said center pole, being shorter than the longitudinal extent of said elongated gaps, and
b. said shorted coil being disposed longitudinally in said elongated gap nearest said mechanical load attached to said rigid structure.
5. The device of claim 1 in which;
a. an end piece (2, 3) is employed at each end of said outer plates, to reduce the external magnetic fields at said ends.
6. The device of claim 1 in which;
a. an end piece (2) is employed at the end of said rectangular core structure adjacent to said mechanical load attached to said rigid structure, to minimize external magnetic field at said load.
7. The device of claim 1, which additionally includes;
a. plural stems (17, 18, 19, 20) attached to the corners of said moving coil, and passing between adjacent elements of the rectangular core-permanent magnet assembly.
8. The device of claim 7 in which;
a. said stems are formed of electrical insulating material.
9. The device of claim 8, which additionally includes;
a. a flexible electrical connection from said moving coil attached to a said stem.
10. The device of claim 4 in which;
a. the thickness of said shorted coil (14) is in the range of from one-half to equal that of said moving coil (16).

* * * * *